United States Patent
Rahm et al.

(10) Patent No.: US 10,081,171 B2
(45) Date of Patent: Sep. 25, 2018

(54) METHOD FOR PRODUCING A SYNCHRONIZER RING

(71) Applicant: DIEHL METALL STIFTUNG & CO. KG, Roethenbach (DE)

(72) Inventors: Sabine Rahm, Lauf (DE); Knut Erdmann, Nuremberg (DE); Martin Doernhoefer, Sulzbach-Rosenberg (DE)

(73) Assignee: Diehl Metall Stiftung & Co. KG, Roethenbach (DE)

( * ) Notice: Subject to any disclaimer, the term of this patent is extended or adjusted under 35 U.S.C. 154(b) by 228 days.

(21) Appl. No.: 15/223,246

(22) Filed: Jul. 29, 2016

(65) Prior Publication Data
US 2017/0028699 A1    Feb. 2, 2017

(30) Foreign Application Priority Data

Jul. 30, 2015   (DE) .................. 10 2015 009 706

(51) Int. Cl.
| | |
|---|---|
| *B32B 37/12* | (2006.01) |
| *B32B 37/14* | (2006.01) |
| *F16D 23/02* | (2006.01) |
| *B23K 26/00* | (2014.01) |
| *F16D 69/02* | (2006.01) |
| *F16D 69/00* | (2006.01) |

(52) U.S. Cl.
CPC .......... *B32B 37/12* (2013.01); *B23K 26/0006* (2013.01); *B32B 37/14* (2013.01); *F16D 23/025* (2013.01); *F16D 69/00* (2013.01); *F16D 69/026* (2013.01); *B32B 2310/0825* (2013.01); *B32B 2310/0843* (2013.01); *F16D 2250/0069* (2013.01); *F16D 2300/12* (2013.01)

(58) Field of Classification Search
CPC ..................................................... B32B 37/12
See application file for complete search history.

(56) References Cited

U.S. PATENT DOCUMENTS

| | | | |
|---|---|---|---|
| 6,056,912 | A | 5/2000 | Sohda et al. |
| 6,079,525 | A | 6/2000 | Dietrich et al. |
| 7,635,511 | B2 | 12/2009 | Holderied et al. |
| 2001/0051258 | A1 | 12/2001 | Hanzawa et al. |
| 2006/0237279 | A1* | 10/2006 | Holderied ............. F16D 23/025 192/107 M |
| 2009/0205922 | A1 | 8/2009 | Eberspacher | |

FOREIGN PATENT DOCUMENTS

| | | |
|---|---|---|
| DE | 19812912 A1 | 10/1998 |
| DE | 10334895 B3 | 5/2005 |
| DE | 102006042442 A1 | 3/2008 |
| EP | 0887572 A1 | 12/1998 |
| EP | 0926111 A2 | 6/1999 |
| EP | 1382879 A1 | 1/2004 |

\* cited by examiner

*Primary Examiner* — Daniel H Lee
(74) *Attorney, Agent, or Firm* — Laurence A Greenberg; Werner H. Stemer; Ralph E. Locher

(57) ABSTRACT

A method for producing a synchronizer ring includes providing a ring body made of metal and having a conical connecting surface, providing a friction ring, corresponding to the connecting surface, made of a composite material of carbon fiber bound with a resin, adhesively bonding the friction ring to the connecting surface, and pyrolyzing exclusively an outer layer of the friction ring which is remote from the connecting surface.

19 Claims, 1 Drawing Sheet

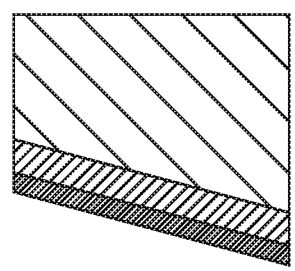
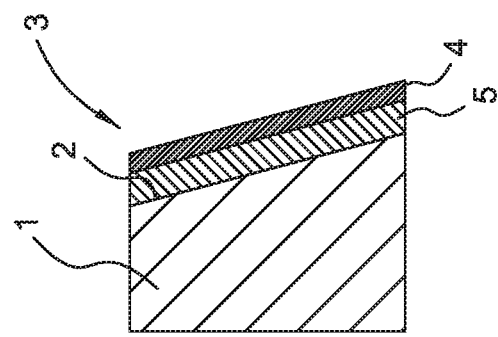

METHOD FOR PRODUCING A SYNCHRONIZER RING

CROSS-REFERENCE TO RELATED APPLICATION

This application claims the priority, under 35 U.S.C. § 119, of German application DE 10 2015 009 706.7, filed Jul. 30, 2015; the prior application is herewith incorporated by reference in its entirety.

BACKGROUND OF THE INVENTION

Field of the Invention

The invention relates to a method for producing a synchronizer ring.

A method of this type is known from German patent DE 103 34 895 B3. In the known method, the friction ring produced from the composite material is pyrolysed at 1,100° C. under an inert gas atmosphere, such that a considerable part of the resin is converted into amorphous carbon. Then, the friction ring treated in this way is again impregnated with resin and the pyrolysis is repeated. Thereafter, the carbon fibers and the carbon produced during the pyrolysis are fixed by impregnation with resin. In a further production step, the friction ring is compacted. Finally, the friction ring produced in this way is adhesively bonded to the connecting surface of the ring body.

The known method requires a relatively large number of production steps and is complex.

SUMMARY OF THE INVENTION

It is an object of the invention to eliminate the disadvantages according to the prior art. The intention is in particular to specify a method which can be carried out as easily and cost-effectively as possible for producing a synchronizer ring having improved friction properties.

This object is achieved by the features of the main patent claim. Expedient configurations of the invention become apparent from the features of the dependent claims.

In accordance with the invention, exclusively an outer layer of a friction ring which is remote from a connecting surface is pyrolysed. The outer layer produced in this way has outstanding friction properties, in particular wet friction properties. A synchronizer ring produced by the method according to the invention is distinguished by a low degree of wear. Since exclusively an outer layer of the friction ring is pyrolysed, the original composite structure of the composite material is retained in the region of an inner layer of the friction ring extending from the connecting surface to the outer layer. The inner layer ensures that the friction ring is bonded particularly firmly to the ring body and also ensures a fixed connection to the outer layer. The proposed method requires few production steps. It can be carried out easily and cost-effectively.

The "conical connecting surface" of the ring body may be an outer circumferential surface or an inner circumferential surface of the ring body. An inclination of the conical connecting surface is typically 8°. The step of adhesively bonding the friction ring to the connecting surface can be carried out before or after the pyrolysis step. The pyrolysis advantageously takes place after the step of adhesively bonding the friction ring to the connecting surface.

According to an advantageous configuration, phenolic or epoxy resin is used as the resin. The carbon fibers expediently form a carbon fiber fabric. A friction ring made of a carbon fiber fabric bound with phenolic resin is distinguished by a particularly high wear resistance.

According to a further configuration of the invention, a first thickness D1 of the friction ring is 0.2 to 1.5 mm, preferably 0.3 mm to 0.6 mm. The outer layer formed by the pyrolysis advantageously has a second thickness D2 of 20 µm to 500 µm, preferably 40 µm to 350 µm, particularly preferably 100 µm to 200 µm. Expediently, an inner layer of the friction ring extending from the connecting surface as far as the outer layer has a third thickness D3 in the range of 100 µm to 500 µm, preferably 250 µm to 350 µm. The following advantageously holds true for a ratio of the third thickness D3 to the second thickness D2:

$D3/D2=c$, where $c$ is a number from 0.5 to 3.0, preferably 1.7 to 2.2.

That is to say that the inner layer is advantageously approximately twice as thick as the outer layer. A synchronizer ring produced in this way is distinguished by outstanding wet friction properties.

According to a further configuration of the invention, the outer layer is pyrolysed at a temperature of at least 600° C., preferably 700° C. to 1500° C. In the region of the outer layer, this gives rise to a composite material having a matrix which consists of carbon and is reinforced with carbon fibers. As the pyrolysis temperature increases, the proportion of the resin in the outer layer increases, this being converted completely into carbon. It may be advantageous to convert the resin in the outer layer only partially into carbon. A proportion of the resin converted completely into carbon in the outer layer advantageously amounts to 40 to 90%.

The pyrolysis is expediently carried out under a protective gas atmosphere, preferably under an $N_2$ or Ar atmosphere. Carrying out the pyrolysis under a protective gas atmosphere counteracts uncontrolled combustion in the region of the outer layer.

According to a further advantageous configuration, the pyrolysis is carried out by a laser, an IR radiator or by contact with a hot metal body. Furthermore, the pyrolysis can be carried out by the application of hot protective gas or a reducing flame. It is particularly advantageous to carry out the pyrolysis using a laser, since it is thereby possible to achieve particularly effectively reproducible results.

The ring body is expediently produced from one of the following materials: brass, steel, sintered steel, brass-steel composite.

Other features which are considered as characteristic for the invention are set forth in the appended claims.

Although the invention is illustrated and described herein as embodied in a method for producing a synchronizer ring, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration of a radial section through a synchronizer ring according to the invention.

DETAILED DESCRIPTION OF THE INVENTION

To produce a synchronizer ring, use is made of a ring body which is produced from brass and which has a conical connecting surface on its inner circumference. A friction ring is then adhesively bonded to the connecting surface by a phenolic resin, the friction ring being formed from a composite material made of a carbon fiber fabric infiltrated with phenolic resin or another temperature-resistant adhesive. The friction ring has a first thickness D1 of, for example, 0.4 to 0.5 mm. Thereafter, an outer layer of the friction ring lying opposite the connecting surface is pyrolysed by a laser. To this end, the ring body can be rotated and simultaneously radiated with the laser on the outer layer. By way of example, the laser may be a $CO_2$ laser, a fiber laser, an Nd:YAG laser or the like. The laser can have a laser energy power in the region of 2 kW.

A power of the laser and also a treatment duration are chosen in such a way as to produce an outer layer having a second thickness D2 in the range of 0.1 to 0.2 mm.

The single FIGURE shows a radial section through a synchronizer ring. A ring body 1 produced, for example, from brass has a conical connecting surface 2 on its inner circumference. A friction ring 3 is adhesively bonded to the conical connecting surface 2. An outer layer 4 of the friction ring 3 is pyrolysed. It consists essentially of a carbon fiber fabric and carbon incorporated therein, the latter being formed for example from graphite or carbon black. The reference sign 5 denotes an inner layer of the friction ring 3. The inner layer 5 is formed from a carbon fabric infiltrated with phenolic resin. The friction ring 3 is expediently adhesively bonded to the connecting surface 2 by means of phenolic resin.

The following is a summary list of reference numerals and the corresponding structure used in the above description of the invention:
1 Ring body
2 Connecting surface
3 Friction ring
4 Outer layer
5 Inner layer
D1 First thickness
D2 Second thickness
D3 Third thickness

The invention claimed is:

1. A method for producing a synchronizer ring, which comprises the steps of:
   providing a ring body made of metal and having a conical connecting surface;
   providing a friction ring, corresponding to the connecting surface, and made of a composite material of carbon fibers bound with a resin;
   adhesively bonding the friction ring to the connecting surface; and
   pyrolysing exclusively an outer layer of the friction ring being remote from the connecting surface.

2. The method according to claim 1, which further comprises selecting the resin from the group consisting of a phenolic resin and an epoxy resin.

3. The method according to claim 1, wherein the carbon fibers form a carbon fiber fabric.

4. The method according to claim 1, which further comprises setting a first thickness of the friction ring to be in a range of 0.2 to 1.5 mm.

5. The method according to claim 4, which further comprises forming the outer layer formed by pyrolysis to have a second thickness D2 of 20 μm to 500 μm.

6. The method according to claim 5, wherein an inner layer of the friction ring extends from the connecting surface as far as the outer layer and has a third thickness D3 in a range of 100 μm to 500 μm.

7. The method according to claim 6, which further comprises setting a ratio of the third thickness D3 to the second thickness D2 according to the following formula:

$$D3/D2=c, \text{ where } c \text{ is a number from 0.5 to 3.0.}$$

8. The method according to claim 6, which further comprises setting a ratio of the third thickness D3 to the second thickness D2 according to the following formula:

$$D3/D2=c, \text{ where } c \text{ is a number from 1.7 to 22.}$$

9. The method according to claim 1, which further comprises pyrolysing the outer layer at a temperature of at least 600° C.

10. The method according to claim 1, which further comprises carrying out the pyrolysing under a protective gas atmosphere.

11. The method according to claim 10, which further comprises selecting the protective gas atmosphere from the group consisting of an $N_2$ atmosphere and an Ar atmosphere.

12. The method according to claim 1, which further comprises carrying out the pyrolysing by means of a laser, an IR radiator or by contact with a hot metal body.

13. The method according to claim 1, which further comprises carrying out the pyrolysing by an application of hot protective gas or a reducing flame.

14. The method according to claim 1, which further comprises producing the ring body from a metal selected from the group consisting of brass, steel, sintered steel, and brass-steel composite.

15. The method according to claim 1, which further comprises setting a first thickness of the friction ring to be in a range of 0.3 mm to 0.6 mm.

16. The method according to claim 1, which further comprises forming the outer layer formed by pyrolysis to have a second thickness of 40 μm to 350 μm.

17. The method according to claim 1, which further comprises forming the outer layer formed by pyrolysis to have a second thickness of 100 μm to 200 μm.

18. The method according to claim 1, wherein an inner layer of the friction ring extends from the connecting surface as far as the outer layer and has a third thickness in a range of 250 μm to 350 μm.

19. The method according to claim 1, which further comprises pyrolysing the outer layer at a temperature in a range of 700° C. to 1500° C.

* * * * *